United States Patent
Rangwala et al.

(10) Patent No.: US 12,438,910 B2
(45) Date of Patent: Oct. 7, 2025

(54) METHODS AND SYSTEMS FOR DETECTING MALICIOUS MESSAGES

(71) Applicant: Capital One Services, LLC, McLean, VA (US)

(72) Inventors: Jignesh Rangwala, Glen Allen, VA (US); Vamsi Kavuri, Glen Allen, VA (US); Lee Adcock, Midlothian, VA (US); Mehulkumar Jayantilal Garnara, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 211 days.

(21) Appl. No.: 17/818,970

(22) Filed: Aug. 10, 2022

(65) Prior Publication Data

US 2024/0056477 A1    Feb. 15, 2024

(51) Int. Cl.
*G06F 21/00*    (2013.01)
*G06N 3/08*    (2023.01)
*H04L 9/40*    (2022.01)

(52) U.S. Cl.
CPC ........... *H04L 63/1483* (2013.01); *G06N 3/08* (2013.01); *H04L 63/1416* (2013.01)

(58) Field of Classification Search
CPC ... H04L 63/1483; H04L 63/1416; G06N 3/08; G06N 20/00
See application file for complete search history.

(56) References Cited

U.S. PATENT DOCUMENTS

| | | | |
|---|---|---|---|
| 8,966,621 B1 * | 2/2015 | Johansson | H04L 63/12 726/30 |
| 9,565,209 B1 * | 2/2017 | Grzonkowski | H04L 51/046 |
| 2014/0179360 A1 * | 6/2014 | Jackson | H04W 12/128 455/466 |
| 2016/0014151 A1 * | 1/2016 | Prakash | H04L 47/62 726/22 |
| 2017/0085584 A1 * | 3/2017 | Goutal | H04L 51/212 |
| 2017/0230403 A1 * | 8/2017 | Kennedy | H04L 63/1483 |
| 2020/0067976 A1 * | 2/2020 | Jakobsson | H04L 51/212 |

* cited by examiner

*Primary Examiner* — Michael M Lee
(74) *Attorney, Agent, or Firm* — Foley & Lardner LLP

(57) ABSTRACT

A user device may obtain message information that includes a first hash that was generated based on a portion of a future message that will be sent to the user device. The user device may determine whether new messages received at the user device appear to be associated with a corresponding entity. If a new message appears to be associated with the entity, the user device may use the message information to confirm whether the new message is malicious. Based on determining that the new message is malicious, the user device may display a notification to a user or perform a variety of other actions.

20 Claims, 5 Drawing Sheets

METHODS AND SYSTEMS FOR DETECTING MALICIOUS MESSAGES

BACKGROUND

Users can use their login credentials for computing systems to access sensitive data maintained by owners of the computing systems, such as a company, an educational institution, a government entity, etc. The owner of the computing system that the user accesses using the login credentials may sometimes send messages to the user, for example, in an email or text message. For example, the user may receive, from the computing system owner, messages containing summaries of account activity or various other notifications. Knowing that the computing system owner sends messages to users, a malicious actor may create imitation messages that look nearly identical to legitimate messages in an attempt to steal the user's login credentials. For example, when a user clicks on a link in an imitation message, the user may be taken to a website that appears to be legitimate but is actually operated by the malicious actor. Not knowing that the website is operated by the malicious actor, the user may attempt to log in and inadvertently provide their login credentials to the malicious actor.

SUMMARY

Detection of malicious messages such as those that may be associated with phishing attempts or other malicious activity is a difficult problem. Conventional systems rely on spam or phishing email filters. These filters are often operated by servers associated with messaging applications, such as text or email applications. Service providers may also operate filtering, for example, for phone calls or text messages. However, these solutions are problematic because they frequently fail to detect malicious messages. Malicious actors are constantly coming up with new ways to circumvent filters so that users will receive and be duped by their malicious messages. One cause of the problem in conventional techniques is that the applications or services do not have enough information to assess whether a message may be a malicious message or a legitimate one.

To address these and other issues, systems and methods described herein use one or more external communication channels to provide additional information to a computing device. The additional information allows multiple computing systems to coordinate messages and thereby enable detection of malicious messages. Specifically, methods and systems described herein provide message information through an external, secure communication channel prior to sending messages via other channels (e.g., email, text messages, etc.). The message information can be used to determine whether a message that purports to be from a particular entity or computing system is actually from that entity or computing system. Because the entity has knowledge of the messages that are to be sent to a user, an application associated with the entity may be used to check incoming messages and verify whether they are legitimate. For example, the application may warn the user when a message purports to be associated with the entity but is actually a malicious imitation message from a malicious actor. In this way, the application can warn the user to not interact with the malicious message. Moreover, methods and systems described herein allow for the detection of malicious messages at the user device rather than a server. Because the message information is sent to the user device, the user device can check for malicious messages without sending message content or metadata to a server. This may reduce the need for network bandwidth and server processing power. Additionally, the privacy of the user is better protected because the message does not need to be sent to a server.

In some embodiments, a user device may obtain message information that includes a first hash that was generated based on a portion of a future message that will be sent to the user device. For example, a server associated with an application on a user device may know in advance a message that will be sent to the user device. The server may generate a first hash of a portion of the message (e.g., a portion of the text, an image in the message, etc.) and send the first hash to the user device. The server and the application may be associated with an entity (e.g., an organization, a company, etc.)

The user device may determine whether new messages received at the user device appear to be associated with the entity. For example, the user device may process some or all of a new message using a machine learning model. If a probability score generated by the machine learning model is above a threshold score, the user device may determine that the new message appears to be associated with the entity. If the score is less than the threshold score, the user device may determine that the new message is not associated with the entity. If a new message appears to be associated with the entity, the user device may use the message information to confirm that the new message is not malicious (e.g., confirm that the new message is not associated with a phishing attempt). For example, the user device may generate a second hash based on a portion of the message and may compare the second hash with the first hash. The user device may determine that the new message is malicious, for example, if the first hash does not match the second hash. Based on determining that the new message is malicious, the user device may display a notification to a user or perform a variety of other actions.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
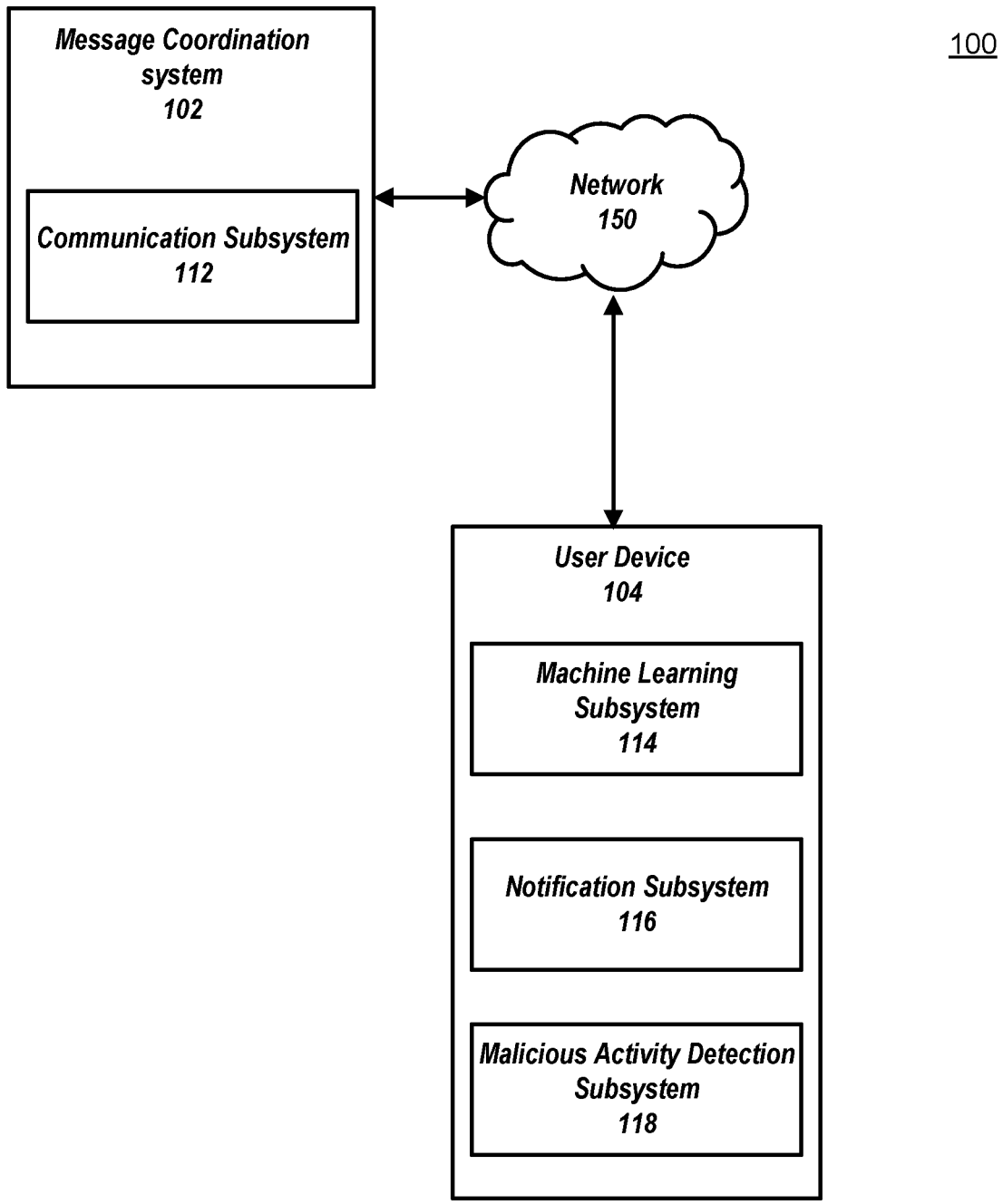
FIG. 1 shows an example system for using an external communication channel to protect against malicious messages, in accordance with some embodiments.

FIG. 1 shows an example computing system 100 for using multiple communication channels to protect against malicious messages. The system 100 may include a message coordination system 102 or a user device 104. The message coordination system 102 may include a communication subsystem 112 that may be used to communicate with the user device 104. The user device 104 may include a machine learning (ML) subsystem 114, a notification subsystem 116, a malicious activity detection subsystem 118, or other components.

The computing system 100 (e.g., the user device 104) may determine whether a message is malicious, for example, as described in more detail below. A malicious message may be any message that has the purpose of obtaining information (e.g., sensitive information such as passwords, usernames, personally identifiable information, or other user information) from a user or from a computing system. A malicious message may be an attempt to trick a user into providing money or other resources to a malicious actor. A malicious message may be a phishing attempt. For example, a malicious message may be a message that has been made to appear as if it is from a particular entity when in fact it was created by a malicious actor. The phishing attempt may be an attempt directed to steal sensitive information associated with an application or the user device 104. For example, the phishing attempt may involve a message including a link that navigates to a web page. The web page may appear similar to a web page associated with the message coordination system 102. The web page may allow malicious actors to steal credentials or other sensitive data from a user of the user device 104. A future legitimate message may be any non-malicious message that is to be sent in the future. For example, a future legitimate message may be a message that is created and eventually sent by the same entity that the message purports to be from.

The user device 104 may obtain message information that allows the user device 104 to know what will be included in future messages (e.g., future legitimate messages) from the message coordination system 102 or other computing systems that are associated with the message coordination system 102 (e.g., one or more servers). One or more portions of the message information may be compared with a new message received by the user device 104. Based on the comparison, the user device 104 may determine whether the new message is malicious or not (e.g., whether the message is associated with a phishing attempt, whether the message may contain malware or a link to a website that will install malware on the user device 104, etc.). The message information may allow the user device 104 to more effectively detect malicious messages because the message information may allow the user device 104 to know what messages will be received from the message coordination system 102.

The message information may be received via a first application (e.g., that is executing on the user device 104 and is associated with the message coordination system 102, or an entity that operates the message coordination system 102). For example, the first application may be a banking application that is in communication with a corresponding bank's server. The bank's server may send the message information to the user device 104 so that when the user device 104 receives a new message that appears to be associated with the bank, the user device 104 can compare the message information with the new message to confirm that the message is legitimate (e.g., is not associated with malicious activity). The message information received by the user device 104 may include a message hash, an expected timestamp, formatting information, a uniform resource locator (URL), or a steganographic image, for example, as described in connection with FIG. 2 below.

The user device 104 may receive new messages from a variety of sources. The new messages may be received via applications that are not associated with the message coordination system 102. For example, the applications that receive new messages may be texting applications, email applications, or a variety of other messaging applications. The new message may be received via a second application that is different from the first application. For example, the second application may be a messaging application (e.g., email, an application that implements the short message service (SMS) protocol, or a variety of other applications that can be used to send data from one device to another device).

To determine whether the message information received from the message coordination system 102 can be used to determine whether a particular new message is malicious or not, the user device 104 may determine whether the new message appears to be associated with the message coordination system 102 or an entity associated with the message coordination system 102. For example, the user device 104 may determine whether a new message may have been designed (e.g., by a malicious actor) to mimic a legitimate message from the message coordination system 102. The user device 104 may determine that the message information should be used to compare with a new message, for example, if the new message appears to be associated with the entity or the message coordination system 102. By performing this initial determination, the user device 104 may be more efficient because there is no need to compare every new message (e.g., even messages not associated with the message coordination system 102) with the message information.

Determining whether the new message is associated with the entity may include comparing one or more words contained in the new message with one or more words on a keyword list associated with the entity. For example, the keyword list may include the name of the entity (e.g., the name of a bank or other organization) that created the new message or is otherwise associated with the message coordination system 102. The keyword list may include words associated with the first application. For example, if the first application is a banking application, the keyword list may include words such as account number, balance, payment, etc. If more than a threshold number of keywords (e.g., three, five, etc.) are included in a new message, the user device 104 may determine that the new message appears to be associated with the entity or the message coordination system 102 (or may determine that the new message is likely associated with malicious activity).

The user device 104 may generate a score indicative of whether a new message appears to be associated with the entity or the message coordination system 102. The user device 104 (e.g., the machine learning subsystem 114) may use a machine learning model to generate the score or probability score. The machine learning model may be a machine learning model as described in connection with FIG. 3 below. The machine learning model may be trained with training data that includes messages (e.g., message text) as training instances (e.g., rows in the training data). Each training instance may include a label that indicates whether the corresponding instance should be classified as being associated with the message coordination system 102 or not. For example, one instance of the training data my include text of a message and a label indicating that the message should be classified as being associated with the message coordination system 102.

The user device 104 may determine whether the score generated (e.g., by the machine learning model) satisfies a threshold score. For example, the user device 104 may determine that the score is greater than a threshold score. If the score satisfies the threshold, the user device 104 may determine that additional checks should be performed to confirm whether the new message is associated with malicious activity. One or more additional checks may include comparing a portion of the new message with a portion of the message information, for example, as discussed in connection with FIG. 2 below.

Figure 2:
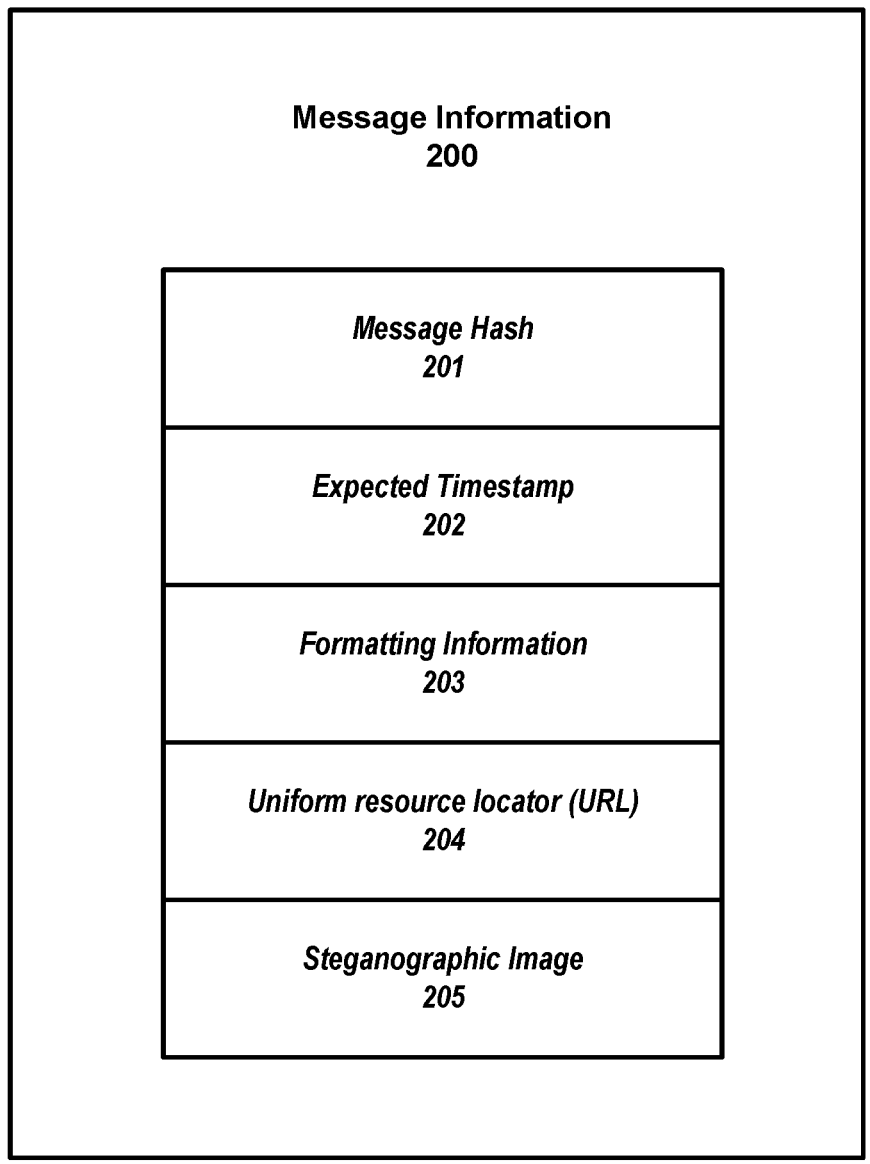
FIG. 2 shows example message information that can be used to coordinate messages and protect against malicious activity, in accordance with some embodiments.

FIG. 2 shows the contents of example message information 200. The message information 200 may include a message hash 201. The message hash 201 may be a hash of a portion of a future message (e.g., a future legitimate message associated with the message coordination system 102 or an entity) to be sent by the message coordination system 102 or received by the user device 104. The future message may be a message that the message coordination system 102 plans to send at a predetermined time in the future. The hash may be used (e.g., as a checksum) to determine whether a message received in the future has been altered or whether the message can be trusted. For example, a first hash in the message information may be compared with a second hash of a portion of a new message that is received at the user device 104. By comparing the two hashes, the user device 104 may determine whether the new message is associated with the entity (e.g., was sent by the message coordination system 102). For example, if the hashes do not match, the user device 104 may determine that the new message should not be trusted or that it is associated with malicious activity. The first and second hashes may be digital fingerprints of a portion of a message (e.g., a portion of the text, timestamp, metadata, or any other information in the message). The first and second hashes may be generated using MD5, a secure hash algorithm (e.g., SHA-1, SHA-2, SHA-224, SHA-256, SHA-384, SHA-512, etc.) or a variety of other cryptographic hash algorithms. The user device 104 may compare the second hash with the first hash, for example, based on determining that the probability score satisfies the threshold score.

The message information 200 may include an expected timestamp 202. The expected timestamp 202 may be a time at which a message is expected to be sent by the message coordination system 102 or received by the user device 104. The expected timestamp 202 may be compared with a timestamp of a new message (e.g., the time at which the new message was received by the user device 104) that appears to be associated with the message coordination system 102. For example, the user device 104 may determine the difference between the timestamp 202 and the timestamp of the new message. The difference may be compared with a threshold (e.g., 3 minutes, 10 minutes, 30 minutes, etc.). If the difference exceeds the threshold, the user device 104 may determine that the new message should not be trusted or is malicious.

The message information 200 may include formatting information 203 of a future message to be received by the user device 104. The formatting information 203 may indicate a number of paragraphs, a number of sentences, the location of whitespace, indentation, or a variety of other types of formatting information of the future message. The formatting information 203 may be compared with the format of a new message received by the user device 104. For example, if a new message does not have the same number of paragraphs as indicated by the formatting information 203, the user device 104 may determine that the new message should not be trusted or may determine that the new message is malicious.

The message information 200 may include a URL 204. The user device 104 may compare the URL 204 with a URL contained in a new message. If the URL does not match the URL 204, the user device 104 may determine that the new message should not be trusted or may determine that the new message is malicious.

The message information 200 may include a steganographic image 205. The steganographic image 205 may be included in a future message sent to the user device 104. The steganographic image 205 may store a code. Alternatively, the message information 200 may include the code without the steganographic image. The user device 104 may determine whether a new message received by the user device 104 contains a steganographic image with the code indicated by the message information. If the new message does not contain the code, the user device 104 may determine that the new message should not be trusted or may determine that the new message is malicious.

In some embodiments, the user device may compare a number of the components of the new message with the corresponding components of the message information, and if more than a threshold number of components of the new message do not match the corresponding components in the message information, the user device 104 may determine that the new message is associated with malicious activity. For example, if the message hash, timestamp, and formatting information indicated by the message information respectively match the message hash, timestamp, and formatting information of the new message, the user device 104 may determine that the new message is not associated with malicious activity. As an additional example, if either the URL or the formatting information of the new message does not match the corresponding components indicated in the message information, the user device 104 may determine that the new message should not be trusted or is malicious.

The user device 104 may display a notification to a user. The notification may be displayed, for example, in response to determining that the new message is malicious (e.g., the new message is a phishing attempt). The notification may include a warning indicating that the new message may be malicious. Additionally or alternatively, the user device 104 may delete the message, mark the message as dangerous (e.g., via a user interface element), or perform a variety of other actions in response to determining that the new message is malicious. For example, the user device 104 may send the new message to a monitoring system associated with the message coordination system 102.

In some embodiments, the user device 104 may perform an additional check using a machine learning model (e.g., as described above or as described in connection with FIG. 3) to determine whether there is a high probability that a message received at the user device 104 is associated with malicious activity. A single organization may include multiple computing systems, each associated with different departments, that send messages to the user device 104. The user device 104 may receive a message from a first department that was not anticipated by the message coordination system 102. For example, the first department may send a message to the user device 104 without notifying the message coordination system 102, and thus the message coordination system 102 may have not sent message information to the user device 104 before the user device 104 receives the message. In this example, the user device 104 may perform the additional check (e.g., using the machine learning model) to determine whether there is a high probability that a message received at the user device 104 is associated with malicious activity. If the user device 104 determines that there is a high probability that a message received at the user device 104 is associated with malicious activity, the user device 104 may display a notification to the user, for example, as described above.

The user device 104 may be any computing device, including, but not limited to, a laptop computer, a tablet computer, a hand-held computer, smartphone, or other computer equipment (e.g., a server or virtual server), including "smart," wireless, wearable, or mobile devices. The message coordination system 102 may include one or more computing devices described above or may include any type of mobile terminal, fixed terminal, or other device. For example, the message coordination system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the message coordination system 102, those operations may be performed by components of the user device 104. In some embodiments, the various computers and systems described herein may include one or more computing devices that are programmed to perform the described functions.

One or more components of the message coordination system 102 or user device 104 may receive content or data via input/output (hereinafter "I/O") paths. The one or more components of the message coordination system 102 or the user device 104 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the message coordination system 102 or the user device 104 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a satellite network, a combination of these networks, or other types of communication networks or combinations of communication networks. The devices in FIG. 1 (e.g., message coordination system 102 or the user device 104) may communicate (e.g., with each other or other computing systems not shown in FIG. 1) via the network 150 using one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The devices in FIG. 1 may include additional communication paths linking hardware, software, or firmware components operating together. For example, the message coordination system 102 or the user device 104 may be implemented, in whole or in part, by one or more computing platforms.

Figure 3:
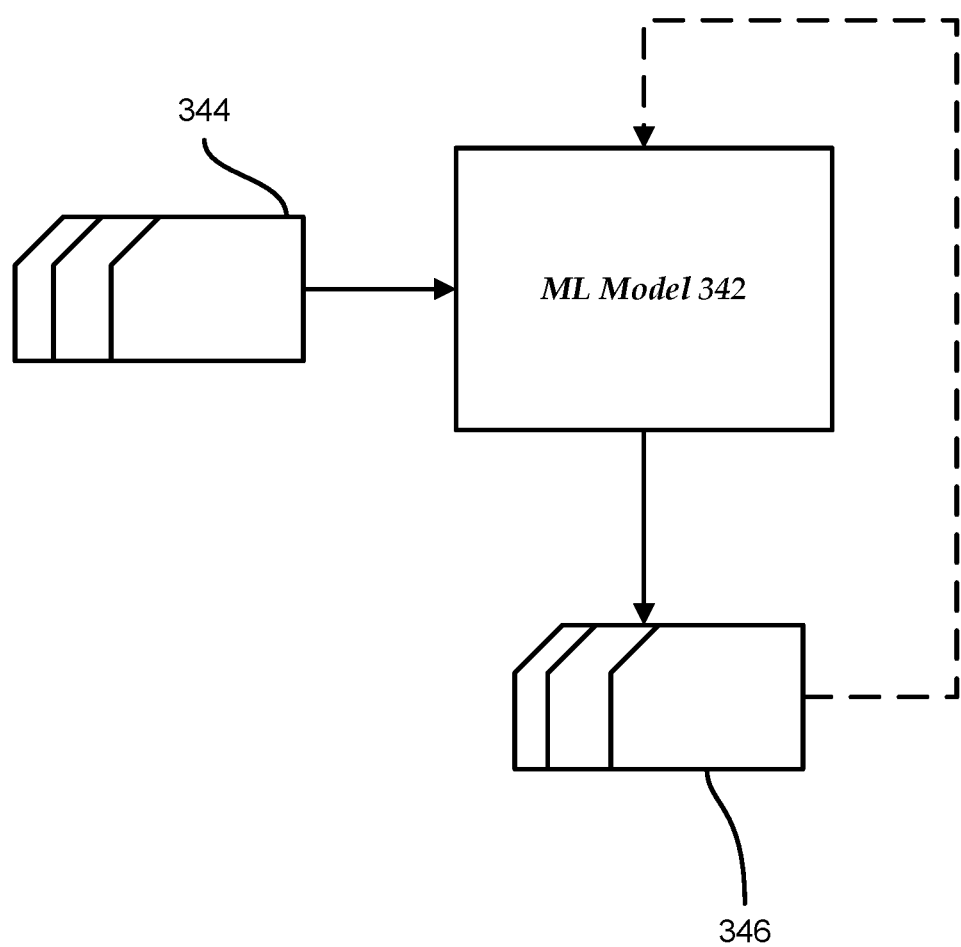
FIG. 3 shows an example machine learning model, in accordance with some embodiments.

One or more machine learning models discussed above may be implemented (e.g., in part), for example, as shown in FIGS. 1-3. With respect to FIG. 3, machine learning model 342 may take inputs 344 and provide outputs 346. In one use case, outputs 346 may be fed back to machine learning model 342 as inputs to train machine learning model 342 (e.g., alone or in conjunction with user indications of the accuracy of outputs 346, labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network and connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed.

In some embodiments, the machine learning model 342 may include an artificial neural network. In some embodiments, the machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 342 may be self-learning or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 trained by the machine learning subsystem 114 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 342 may be structured as a factorization machine model. The machine learning model 342 may be a non-linear model or supervised learning model that can perform classification or regression. For example, the machine learning model 342 may be a general-purpose supervised learning algorithm that the system uses for both classification and regression tasks. Alternatively, the machine learning model 342 may include a Bayesian model configured to perform variational inference. The machine learning model 342 may be configured to determine whether two datasets are similar, to generate a vector representation of a dataset or a portion of a dataset, or a variety of other functions described above in connection with FIGS. 1-3.

Figure 4:
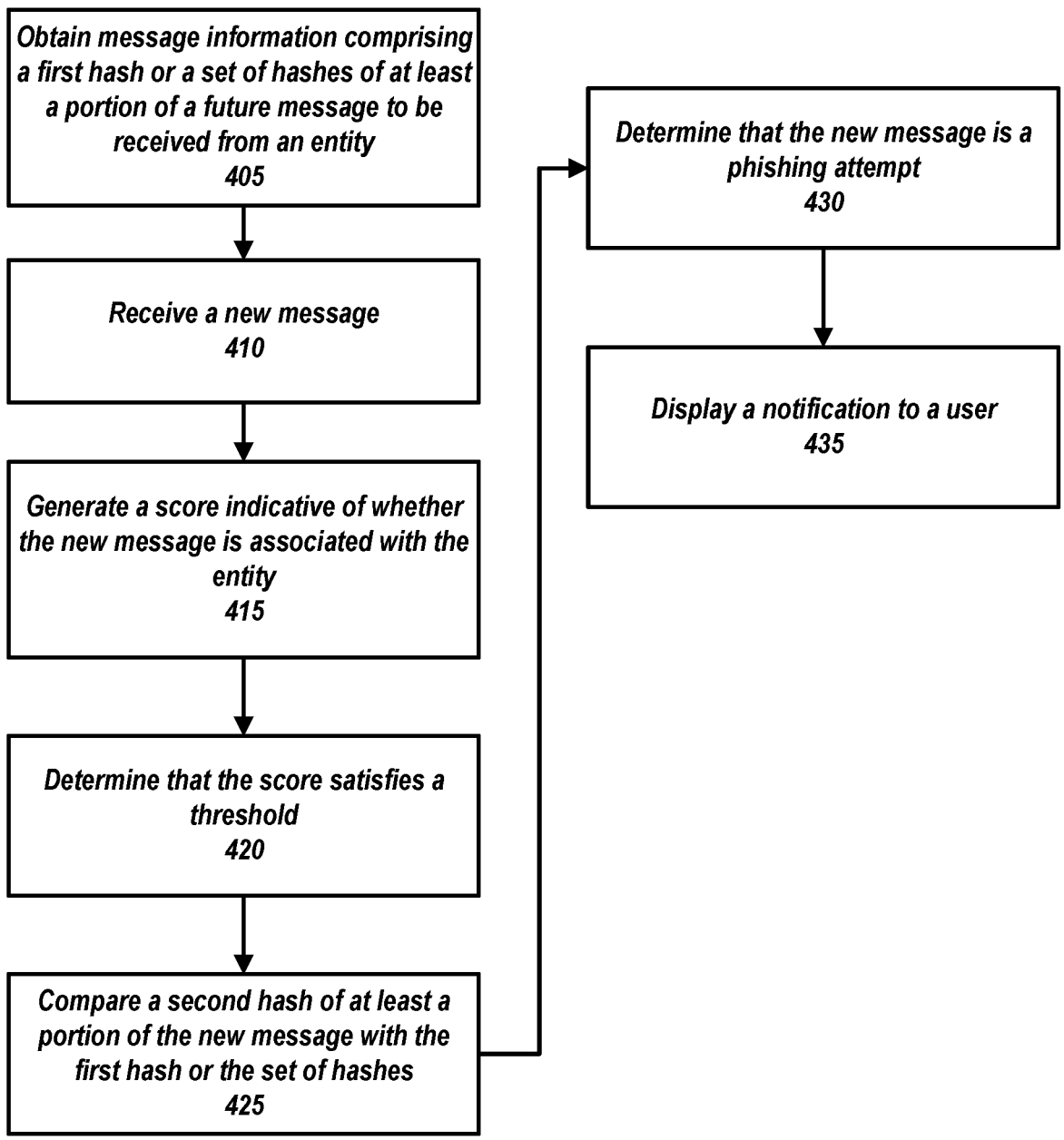
FIG. 4 shows an example flowchart of the actions involved in using an external communication channel to protect against malicious messages, in accordance with some embodiments.

FIG. 4 is an example flowchart of processing operations of a method that enables the various features and functionality of the systems as described in detail above. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

Figure 5:
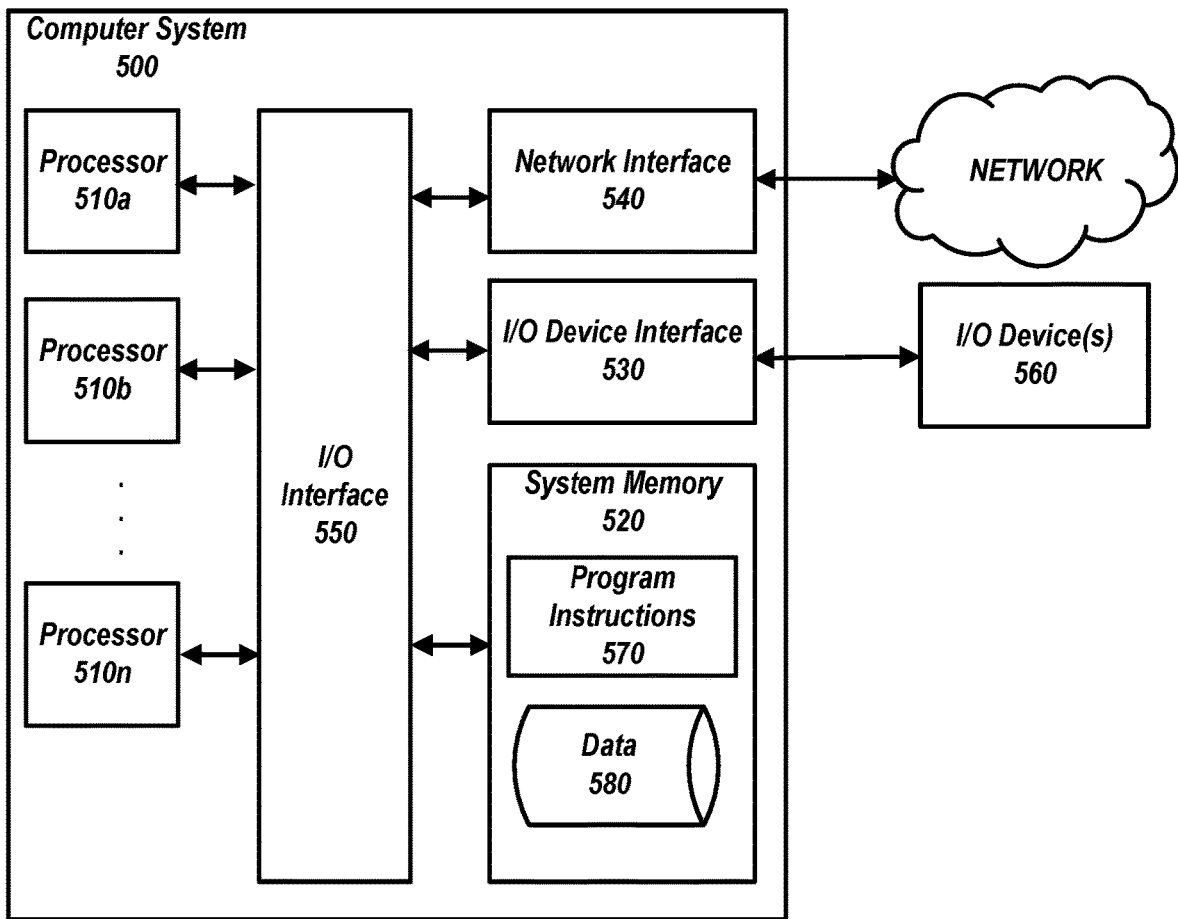
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that the operations performed by user device 104 or message coordination system 102 may be performed using one or more components in system 100 (FIG. 1) or computer system 500 (FIG. 5).

FIG. 4 shows an example flowchart of the actions involved in reporting software errors. For example, process 400 may represent the actions taken by one or more devices shown in FIGS. 1-3 and described above. At 405, user device 104 may obtain message information comprising a first hash (or a set of hashes) of at least a portion of a future message to be received. The future message may be a message that the message coordination system 102 plans to send at a predetermined time in the future. The future message may be associated with an entity and associated with the message coordination system 102. For example, the entity may be a bank, and the future message may be a message summarizing account activity and may be sent by a message coordination system (e.g., a server) that is under the control of the bank. The first hash may be used as a checksum to determine whether a message received in the future has been altered or whether the message can be trusted. The message information may be received via a first application that is associated with the message coordination system 102. For example, the first application may be a banking application that is in communication with a corresponding bank's message coordination system.

At 410, user device 104 may receive a new message. The new message may be received via a second application that is different from the first application. For example, the second application may be a messaging application (e.g., email, an application that implements the short message service (SMS) protocol, or a variety of other applications that can be used to send data from one device to another device).

At 415, user device 104 may generate a score indicative of whether the new message is associated with the entity. In response to receiving the new message, the user device 104 may generate a probability score indicative of whether the new message is associated with the entity. The user device 104 may use a machine learning model (e.g., as described in connection with FIG. 3) to generate the score or probability score. The score may indicate how likely it is that the new message is associated with the entity or how likely it is that the new message is associated with malicious activity (e.g., a phishing attempt).

Determining the likelihood of a message being associated with malicious activity may prevent the user device from reporting false positives and as a result may provide for an improved user experience. A message application may receive many messages that are not associated with malicious activity or are not associated with the first application. For example, many legitimate messages may be received at the user device 104, and the message information received by the user device 104 may be useful for determining whether a phishing attempt is targeting sensitive information associated with the first application. For example, if the first application is a banking application, the message information may contain information associated with future messages associated with the user's bank account and might not include information that allows the user device 104 to determine whether a message that is associated with a different entity (e.g., a music company with an associated music application) is a phishing attempt.

At 420, user device 104 may determine that the score generated at 415 satisfies a threshold score. For example, the user device 104 may determine that the score is greater than a threshold score. If the score satisfies the threshold score, the user device 104 may determine that the message is associated with the entity. Additionally or alternatively, if the score satisfies the threshold score, the user device 104 may determine that the message is potentially malicious. If the score satisfies the threshold, the user device 104 may determine that additional checks should be performed to confirm whether the new message is associated with malicious activity. For example, the user device 104 may confirm whether the new message is associated with malicious activity by comparing a portion of the new message with the message information received at 405, as discussed in more detail below and in connection with FIG. 2.

At 425, user device 104 may compare a portion of the new message with the message information received at 405. For example, the user device 104 may compare a second hash of at least a portion of the new message with the first hash received at 405. The first and second hashes may be digital fingerprints of a portion of a message (e.g., a portion of the text, timestamp, metadata, or any other information in the message). The first and second hashes may be generated using MD5, a secure hash algorithm (e.g., SHA-1, SHA-2, SHA-224, SHA-256, SHA-384, SHA-512, etc.), or a variety of other cryptographic hash algorithms. The user device 104 may compare the second hash with the first hash, for example, based on determining that the probability score satisfies the threshold score.

At 430, the user device 104 may determine whether the new message is malicious (e.g., associated with a phishing attempt). The user device 104 may determine that the new message is malicious, for example, if a portion of the message information does not match a portion of the new message. For example, the user device 104 may determine that the new message is a phishing attempt if the first hash contained in the message information does not match the second hash that was generated using a portion of the new message. Additionally or alternatively, the user device 104 may determine that the new message is malicious if a URL in the new message does not match a URL in the message information received at 405.

At 435, the user device 104 may display a notification to a user. The notification may be displayed, for example, in response to determining that the new message is malicious. The notification may include a warning indicating that the new message may be a phishing attempt. Additionally or alternatively, the user device 104 may delete the message, mark the message as dangerous (e.g., using a user interface element), or perform a variety of other actions in response to determining that the new message is malicious.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 or FIG. 5 could be used to perform one or more of the actions in FIG. 4.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a single unit-processor system including one processor (e.g., processor 510a) or a multi-processor system including any number of suitable processors (e.g., processors 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communication network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage devices while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

Due to cost constraints, some features disclosed herein may not be presently claimed and may be claimed in later filings, such as continuation applications or amendments of the present claims. Similarly, due to space constraints, neither the Abstract nor the Summary section of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompass both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: obtaining, via a first application associated with an entity, message information comprising a first hash based on at least a portion of a first message; receiving, via a second application, a new message; in response to receiving the new message, determining whether the new message is associated with the entity; in response to determining that the new message is associated with the entity, comparing a second hash based on at least a portion of the new message with the first hash; in response to comparing the second hash with the first hash, determining that the new message is malicious; and in response to determining that the new message is malicious, displaying a notification to a user.
2. The method of any of the preceding embodiments, wherein determining whether the new message is malicious comprises: determining that an image of the new message does not include a code within the image, wherein the code is indicated by the message information; and based on determining that the image of the new message does not include the code, determining that the new message is malicious.
3. The method of any of the preceding embodiments, further comprising: in response to determining that the new message is malicious, deleting the new message.
4. The method of any of the preceding embodiments, wherein determining whether the new message is associated with the entity comprises: processing, using a machine learning model, at least a portion of the new message to generate a probability score indicative of whether the new message is associated with the entity; determining that the probability score satisfies a threshold; and in response to determining that the probability score satisfies the threshold, determining that the new message is associated with the entity.
5. The method of any of the preceding embodiments, wherein determining whether the new message is associated with the entity comprises: determining, via a regular expression, that the new message contains a plurality of keywords; and in response to determining that the new message contains a plurality of keywords, determining that the new message is associated with the entity.
6. The method of any of the preceding embodiments, wherein the message information further comprises a time at which the first message will be sent, and wherein determining that the new message is malicious further comprises: determining a difference between a first timestamp of the new message and the time at which the first message will be sent; and in response to determining that the difference exceeds a second threshold, determining that the new message is malicious.

7. The method of any of the preceding embodiments, wherein determining that the new message is malicious further comprises: determining that a first hyperlink in the new message does not match a second hyperlink included in the message information; and in response to determining that the first hyperlink in the new message does not match the second hyperlink included in the message information, determining that the new message is malicious.

8. The method of any of the preceding embodiments, wherein determining that the new message is malicious further comprises: comparing formatting information indicated by the message information with a formatting of the new message; and in response to determining that the formatting information does not match the formatting of the new message, determining that the new message is malicious.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A mobile device associated with a user for reducing computer network bandwidth and server processing resources via local determination of malicious messages, the mobile device comprising:
one or more processors and non-transitory computer-readable media comprising instructions that, when executed by the one or more processors, cause operations comprising:
prior to a second user application on the mobile device receiving a new message from a server associated with an entity, receiving, via a first user application executing on the mobile device associated with the entity, a reference hash from the server associated with the entity sending the new message, wherein the reference hash is associated with at least a portion of the new message;
receiving, via the second user application on the user-mobile device, the new message;
in response to determining that the new message is associated with the entity, comparing, with the reference hash, a second hash derived from hashing at least the portion of the received new message; and
in response to the mobile device comparing the second hash with the reference hash, determining, based on the comparison, that the received new message is a phishing attempt and displaying a notification to the user, the phishing attempt being directed to steal sensitive information associated with the first user application, wherein the first user application is different from the second user application, via which the new message is received.

2. The mobile device of claim 1, wherein the mobile device obtains message information via the first user application, and wherein the message information comprises a time at which the new message will be sent, wherein determining that the received new message is the phishing attempt further comprises:
determining a difference between a first timestamp of the received new message and a second timestamp of the message information; and
in response to determining that the difference exceeds a second threshold, determining that the received new message is the phishing attempt.

3. The mobile device of claim 1, wherein determining that the received new message is the phishing attempt further comprises:
determining that a first hyperlink in the received new message does not match a second hyperlink included in message information obtained via the first user application; and
in response to determining that the first hyperlink in the new message does not match the second hyperlink included in the message information, determining that the received new message is the phishing attempt.

4. The mobile device of claim 1, wherein determining that the received new message is the phishing attempt further comprises:
comparing formatting information indicated by message information with a formatting of the received new message, wherein the message information is obtained via the first user application; and
in response to determining that the formatting information does not match the formatting of the received new message, determining that the received new message is the phishing attempt.

5. A method for determination of malicious messages comprising:
prior to a second application receiving a first message on a user device associated with an entity, receiving, via a first application on the user device associated with the entity, a first hash, associated with at least a portion of the first message, from a server associated with the entity;
receiving, via the second application on the user device, a new message, wherein the second application is different than the first application;
in response to determining that the new message is associated with the entity, comparing, with the first hash, on the user device, a second hash based on at least the portion of the new message;
in response to the user device comparing the second hash with the first hash, determining whether the new message is malicious; and
in response to determining that the new message is malicious, displaying a notification to a user.

6. The method of claim 5, wherein determining whether the new message is malicious comprises:
determining that an image of the new message does not include a code within the image, wherein the code is indicated by message information obtained via the first application; and
based on determining that the image of the new message does not include the code, determining that the new message is malicious.

7. The method of claim 5, further comprising:
in response to determining that the new message is malicious, deleting the new message.

8. The method of claim 5, wherein determining whether the new message is associated with the entity comprises:
processing, using a machine learning model, at least the portion of the new message to generate a probability score indicative of whether the new message is associated with the entity;
determining that the probability score satisfies a threshold; and
in response to determining that the probability score satisfies the threshold, determining that the new message is associated with the entity.

9. The method of claim 5, wherein determining whether the new message is associated with the entity comprises:
determining, via a regular expression, that the new message contains a plurality of keywords; and
in response to determining that the new message contains the plurality of keywords, determining that the new message is associated with the entity.

10. The method of claim 5, wherein the user device obtains message information via the first application, and wherein the message information comprises a time at which the first message will be sent, wherein determining that the new message is malicious further comprises:
determining a difference between a first timestamp of the new message and the time at which the first message will be sent; and
in response to determining that the difference exceeds a threshold, determining that the new message is malicious.

11. The method of claim 5, wherein determining that the new message is malicious further comprises:
determining that a first hyperlink in the new message does not match a second hyperlink included in message information obtained via the first application; and
in response to determining that the first hyperlink in the new message does not match the second hyperlink included in the message information, determining that the new message is malicious.

12. The method of claim 5, wherein determining that the new message is malicious further comprises:
comparing formatting information indicated by message information with formatting of the new message, wherein the message information is obtained via the first application; and
in response to determining that the formatting information does not match the formatting of the new message, determining that the new message is malicious.

13. One or more non-transitory computer-readable media comprising instructions for determination of malicious messages that, when executed by one or more processors, cause operations comprising:
receiving, via a first application on a user device associated with an entity, a first hash, associated with at least a portion of a first message, from a server associated with the entity;
receiving, via a second application on the user device, a new message, wherein the second application is different than the first application;
in response to determining that the new message is associated with the entity, comparing, with the first hash, on the user device, a second hash based on at least the portion of the new message;
in response to the user device comparing the second hash with the first hash, determining whether the new message is malicious; and
in response to determining that the new message is malicious, displaying a notification to a user.

14. The one or more non-transitory computer-readable media of claim 13, wherein determining whether the new message is malicious comprises:
determining that an image of the new message does not include a code within the image, wherein the code is indicated by message information obtained via the first application; and
based on determining that the image of the new message does not include the code, determining that the new message is malicious.

15. The one or more non-transitory computer-readable media of claim 13, wherein the instructions, when executed by the one or more processors, cause operations further comprising:
in response to determining that the new message is malicious, deleting the new message.

16. The one or more non-transitory computer-readable media of claim 13, wherein determining whether the new message is associated with the entity comprises:
processing, using a machine learning model, at least the portion of the new message to generate a probability score indicative of whether the new message is associated with the entity;
determining that the probability score satisfies a threshold; and
in response to determining that the probability score satisfies the threshold, determining that the new message is associated with the entity.

17. The one or more non-transitory computer-readable media of claim 13, wherein determining whether the new message is associated with the entity comprises:
determining, via a regular expression, that the new message contains a plurality of keywords; and
in response to determining that the new message contains the plurality of keywords, determining that the new message is associated with the entity.

18. The one or more non-transitory computer-readable media of claim 13, wherein the user device obtains message information via the first application, and wherein the message information comprises a time at which the first message will be sent, wherein determining that the new message is malicious further comprises:
determining a difference between a first timestamp of the new message and the time at which the first message will be sent; and
in response to determining that the difference exceeds a threshold, determining that the new message is malicious.

19. The one or more non-transitory computer-readable media of claim 13, wherein determining that the new message is malicious further comprises:
determining that a first hyperlink in the new message does not match a second hyperlink included in message information obtained via the first application; and
in response to determining that the first hyperlink in the new message does not match the second hyperlink included in the message information, determining that the new message is malicious.

20. The one or more non-transitory computer-readable media of claim 13, wherein determining that the new message is malicious further comprises:
comparing formatting information indicated by message information with formatting of the new message, wherein the message information is obtained via the first application; and in response to determining that the formatting information does not match the formatting of the new message, determining that the new message is a phishing attempt.

* * * * *